US008141900B2

(12) United States Patent
Yamazaki

(10) Patent No.: US 8,141,900 B2
(45) Date of Patent: Mar. 27, 2012

(54) AIRBAG APPARATUS

(75) Inventor: Yasuharu Yamazaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 197 days.

(21) Appl. No.: 12/731,468

(22) Filed: Mar. 25, 2010

(65) Prior Publication Data

US 2010/0244417 A1 Sep. 30, 2010

(30) Foreign Application Priority Data

Mar. 30, 2009 (JP) ................................ 2009-083088

(51) Int. Cl.
*B60R 21/26* (2006.01)

(52) U.S. Cl. ...................... 280/736; 280/741; 280/743.2

(58) Field of Classification Search .................. 280/736, 280/741, 743.2
See application file for complete search history.

(56) References Cited

U.S. PATENT DOCUMENTS 6,616,184 B2 * 9/2003 Fischer ...................... 280/743.2
7,559,564 B2 * 7/2009 Takimoto ...................... 280/274
7,793,978 B2 * 9/2010 Vigeant et al. ............ 280/743.2

FOREIGN PATENT DOCUMENTS

JP 6-191366 7/1994
JP 2677951 7/1997
JP 2006-176018 7/2006

* cited by examiner

*Primary Examiner* — Faye M. Fleming
(74) *Attorney, Agent, or Firm* — Smith, Gambrell & Russell, LLP

(57) ABSTRACT

As ignition control patterns for a multi-stage inflator, a first control pattern for controlling a maximum internal pressure of an airbag in a deployed state to be a set pressure or higher and a second control pattern for controlling the maximum internal pressure of the airbag in a deployed state to the set pressure or lower are set to a control unit. A connecting band for partially limiting deployment of an airbag body in a side closer to an occupant protecting portion by connecting the side closer to a base and the side closer to the occupant protecting portion of the airbag body is provided to the airbag, and the strength of the connecting band is set such that the connecting band is to be torn when an internal pressure of the airbag in a deployed state reaches the set pressure or higher.

7 Claims, 4 Drawing Sheets

21b 21a 24Ra 28 27 50 23 23a 21 20

[FIG. 1]
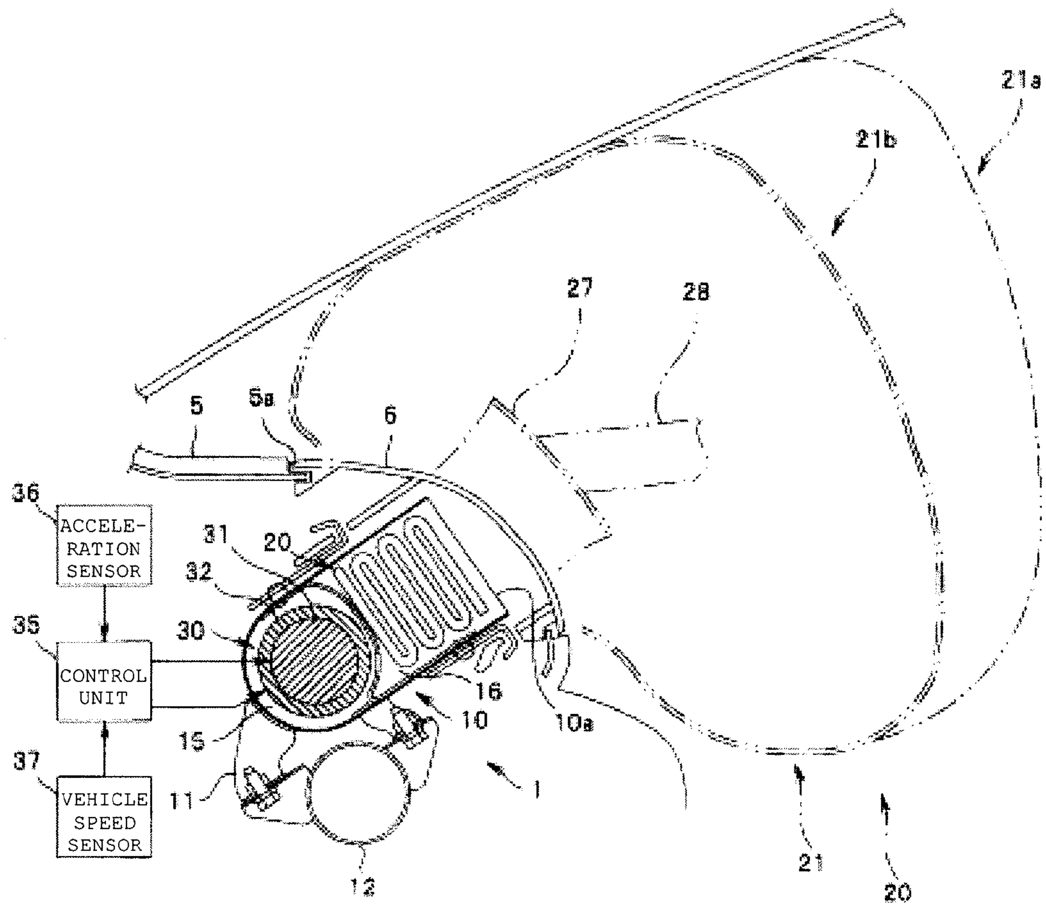
[FIG. 2]
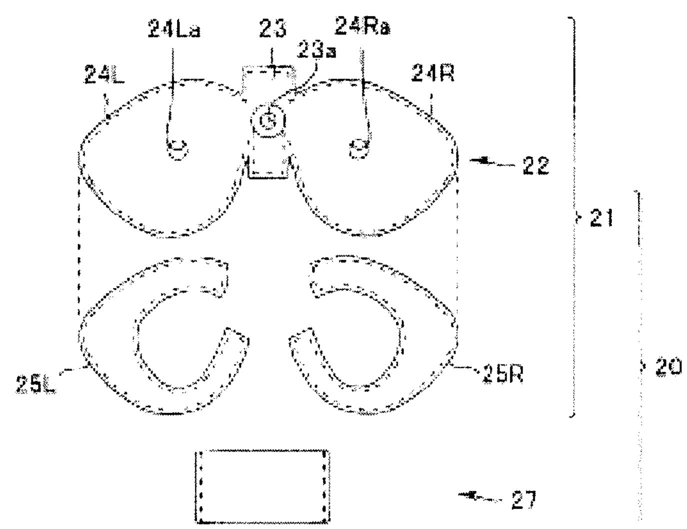

[FIG. 6]
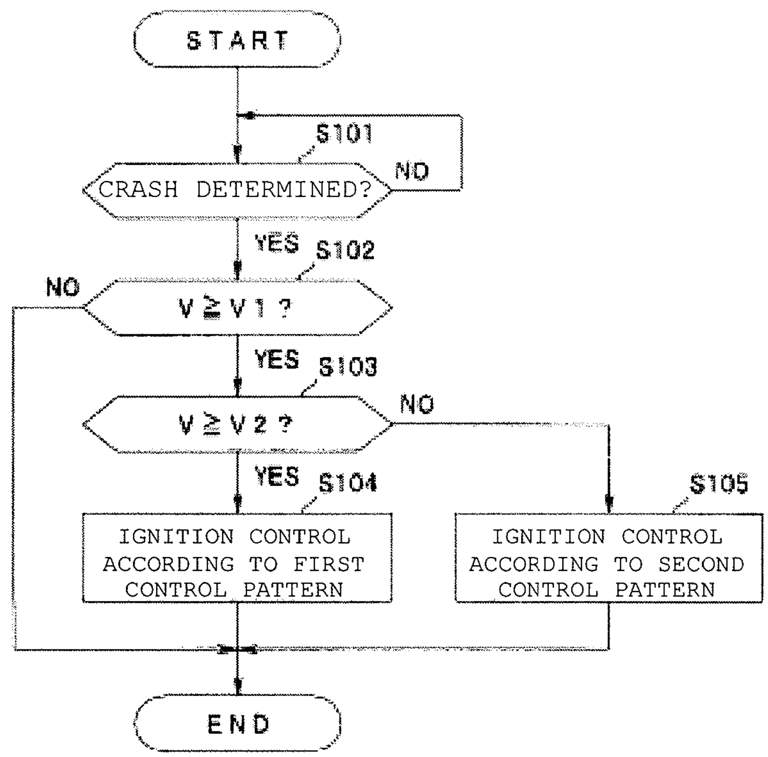
[FIG. 7]
Fig. 7A
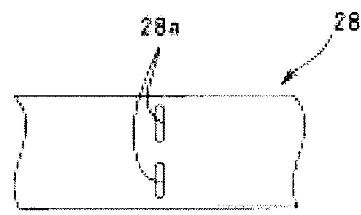
Fig. 7B
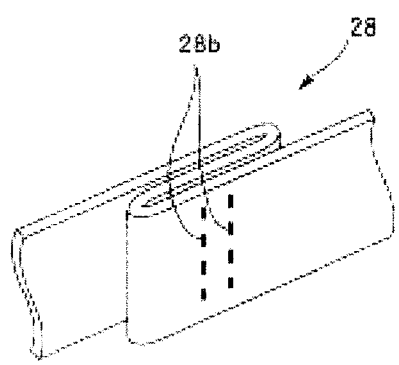

AIRBAG APPARATUS

CROSS-REFERENCE TO RELATED APPLICATIONS

The present application claims priority from Japanese Patent Application No. 2009-083088 filed on Mar. 30, 2009, and is hereby incorporated by reference in its entirety.

BACKGROUND OF THE INVENTION

1. Field of the Invention

The present invention particularly relates to an airbag apparatus that is preferable to protect a front seat occupant in case of a head-on crash.

2. Description of Related Art

Regarding an airbag apparatus, various measures have been taken to minimize harm to an occupant when an airbag is deployed. For example, Japanese Patent Application Laid-Open (JP-A) No. 2006-176018 discloses an airbag apparatus of a front occupant seat in which a substantially vertically extending concave portion is provided at a middle part of an airbag in order to reduce an impact applied to an occupant when the airbag is deployed.

Further, for example, Japanese Examined patent No. 2677951 discloses a technology in which an inflation control member that connects a front part and a rear part of an airbag is provided, a releasable connection part formed on the inflation control member is released in stages while deploying the airbag, and the airbag is made to be a fully deployed shape as dissipating kinetic energy generated during the inflation.

SUMMARY OF THE INVENTION

In recent years, efforts have been made to apply an operation condition of an airbag to a case of a low-speed crash (minor crash) caused at a speed slower than a predetermined vehicle speed, in addition to a case of a high-speed crash caused at a speed equal to or higher than the predetermined vehicle speed. When an airbag is activated in such a low-speed crash, it is required to realize not only protection of an occupant with the airbag (restraint performance) but also reduction of harmfulness of the airbag applied to the occupant at an improved level. In this case, the reduction of the harmfulness should be widely considered for a child sitting forward of a regular seating position, for example, in addition to an occupant seated in the regular seating position.

However, when a deeper concave portion is simply formed in the technology disclosed in JP-A No. 2006-176018 to satisfy the above requirements, performance of the airbag for restraining the occupant in the regular seating position may be reduced.

Further, even when a kinetic energy is dissipated by the inflation control member according to the technology disclosed in the Patent No. 2006-176018, a large impact may be given to the occupant sitting forward of the regular seating position while the airbag moves to a fully deployed state.

The present invention has been made in view of the above problem and an object thereof is to provide an airbag apparatus that realizes reduction of harmfulness of an airbag applied to an occupant and protection of the occupant at an improved level.

The present invention provides an airbag apparatus including: an airbag; a limiter configured to partially limit a preset deployment of the airbag toward a side for protecting an occupant; a multi-stage inflator that includes plural inflator units which are individually ignition controllable; and a controller configured to perform an ignition control of the inflator, wherein the limiter is configured to release the limit when an internal pressure of the airbag in a deployed state becomes equal to or greater than a set pressure, and the controller has, as ignition control patterns for the inflator, a first control pattern for controlling a maximum internal pressure of the airbag in a deployed state to be equal to or greater than the set pressure and a second control pattern for controlling the maximum internal pressure of the airbag in a deployed state to be less than the set pressure.

The airbag apparatus of the present invention realizes reduction of harmfulness of the airbag applied to an occupant and protection of the occupant at an improved level.

BRIEF DESCRIPTION OF THE DRAWINGS

FIG. 1 is a schematic view of an airbag apparatus;

FIG. 2 is a plan view of components of an airbag;

FIG. 6 is a flowchart showing an inflator ignition control routine; and

FIGS. 7A and 7B are explanatory views showing modifications of a deployment limit belt.

DETAILED DESCRIPTION OF THE PREFERRED EMBODIMENT

Figure 3A:
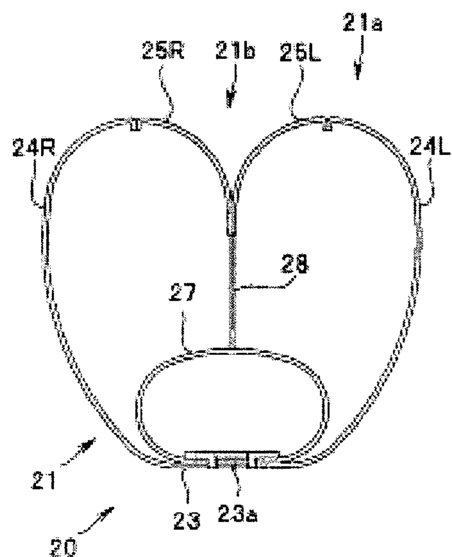
FIGS. 3A and 3B are perspective views of the deployed airbag.

An embodiment of the present invention will be explained below with reference to the drawings. In FIG. 1, reference numeral 1 represents an airbag apparatus, especially, one for front occupant seat disposed in an instrument panel 5 in the present embodiment. The airbag apparatus 1 is mainly composed of an airbag 20 and an inflator 30 for supplying inflation gas to the airbag 20, which are housed and held in a case 10.

The case 10 is, for example, formed of a sheet-metal hollow member having a rectangular opening 10*a* at an upper end thereof and a lower portion of the case 10 is supported by a steering support beam 12 via a bracket 11. In the case 10, a substantially cylindrical inflator container 15 is defined and an airbag container 16 is formed on an upper portion of the inflator container 15.

The instrument panel 5 has an opening 5*a* that connects the airbag container 16 (opening 10*a*) to an area in a vehicle interior side and the opening 5*a* is closed by a lid 6. When the inflator 30 is activated, the lid 6 is pressed and opened by the airbag 20 toward the vehicle interior so that the opening 5*a* is opened and the airbag 20 is deployed in the vehicle interior.

The airbag 20 has an airbag body 21 and a straightening cloth 27 provided inside the airbag body 21.

The airbag body 21 is mainly composed of a main cloth 22, a pair of left and right secondary clothes 25L, 25R which are stitched to the main cloth 22.

The main cloth 22 includes a strip-shaped base 23 that has an intake port 23*a* that introduces inflation gas from the inflator 30. On both sides of the base 23, a pair of cloth portions 24L and 24R having a substantially rectangular outer shape which are rounded in a predetermined manner is integrally formed. The left and right cloth portions 24L, 24R have exhaust ports 24La and 24Ra respectively for discharging inflation gas.

The secondary clothes 25L and 25R respectively have substantially C-shaped outer shapes which are symmetrical to each other and outer edge portions of the secondary clothes 25L and 25R are stitched to outer edge portions of the left and right cloth portions 24L and 24R, respectively. Further, inner edge portions of the left and right secondary clothes 25L and 25R are stitched to each other.

Regarding the airbag body 21 composed of the stitched clothes 22, 25L, 25R, a face portion that faces the base 23 upon deployment is formed as an occupant protecting portion 21*a* and, at the middle part of the occupant protecting portion 21*a*, a concave portion 21*b* extending in a substantially vertical direction is formed. The concave portion 21*b* is mainly defined by the secondary clothes 25L and 25R and, in particular, the depth or the like of the concave portion 21*b* depends on the shapes of the inner edge portions of the secondary clothes 25L and 25R.

Figure 4A:
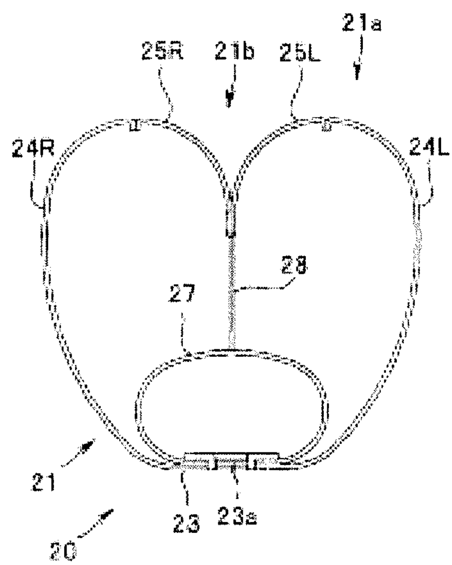
FIGS. 4A and 4B are fragmentary sectional views of the deployed airbag.
Figure 5A:
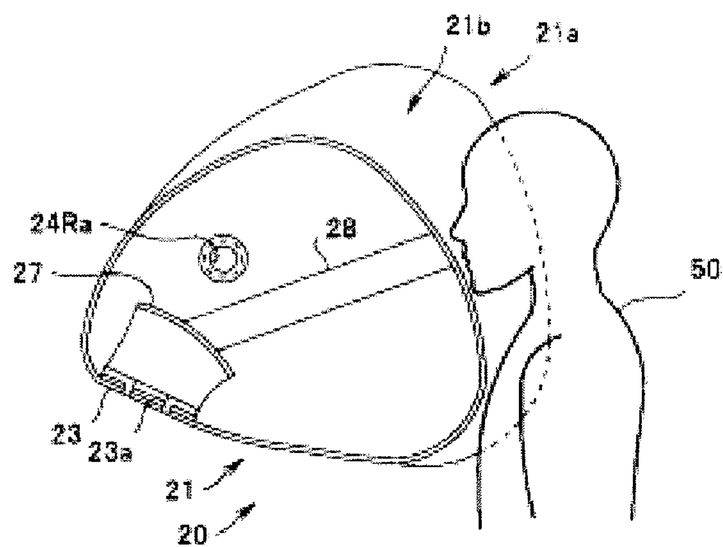
FIGS. 5A and 5B are explanatory views showing a relationship between the airbag and an occupant.

The straightening cloth 27 is a member having a substantially rectangular outer shape and stitched to the base 23 so as to face the intake port 23*a* in the airbag body 21. To the straightening cloth 27, an end of a connecting band 28 serving as a limiter is stitched. The other end of the connecting band 28 is connected to the stitched portion of the left and right secondary clothes 25L and 25R on the side closer to the occupant protecting portion 21*a*. Then, the length of the connecting band 28 is set shorter, by a predetermined amount, than a distance between the straightening cloth 27 and the concave portion 21*b* upon full deployment of the airbag body 21 so that the connecting band 28 deforms the shape of the deployed airbag body 21. More specifically, since the connecting band 28 partially limits the deployment of the occupant protecting portion 21*a*, a protruding amount of the airbag body 21 toward the occupant is limited and the depth of the concave portion 21*b* is increased, compared to the fully deployed case (see FIGS. 3A, 4A and 5A).

Figure 3B:
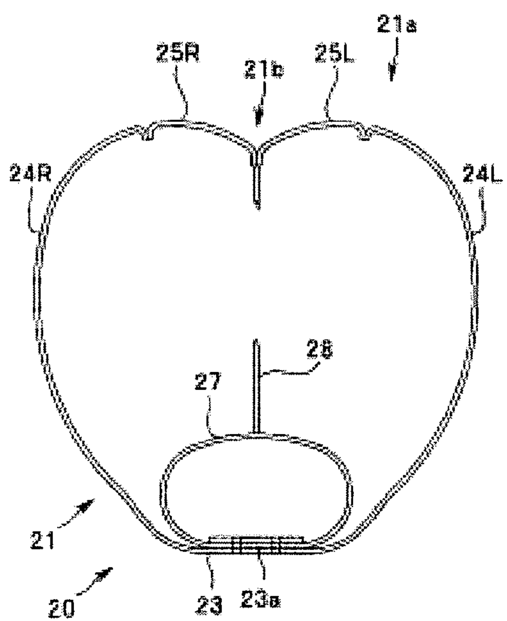
Figure 4B:
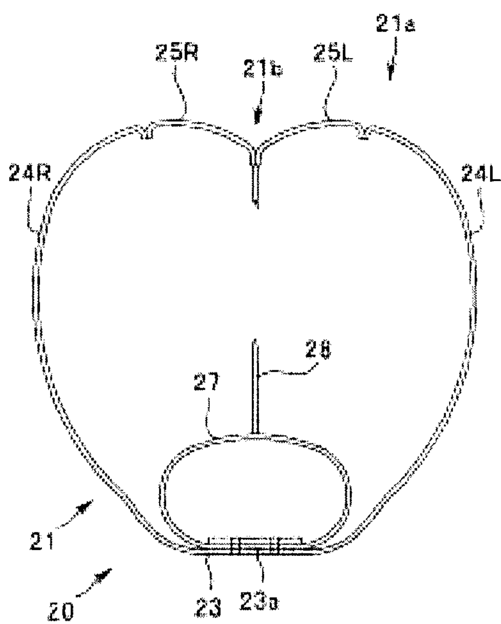
Figure 5B:
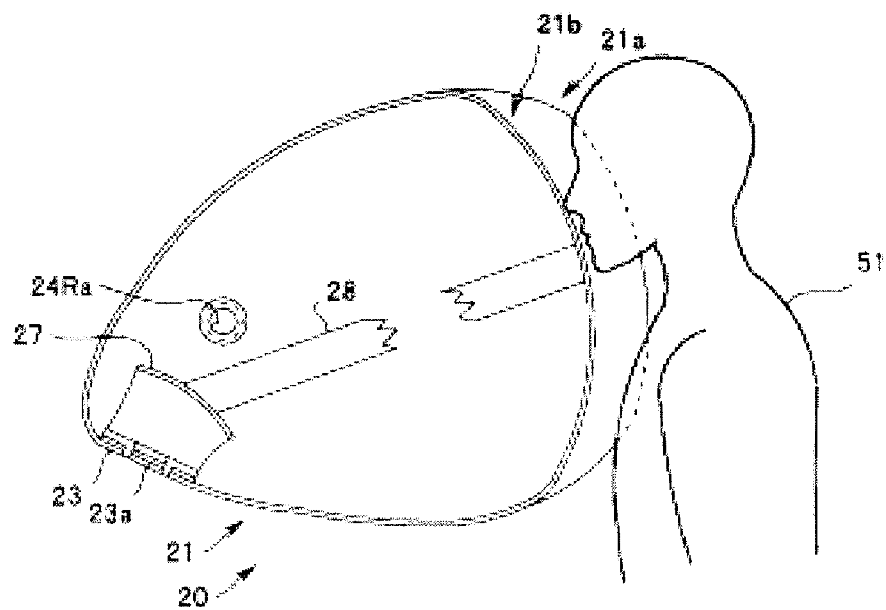

The strength of the connecting band 28 is set such that, for example, the connecting band 28 is to be torn when an internal pressure of the airbag body 21 becomes equal to or greater than a set pressure P (P=400 KPa, for example). When the internal pressure of the airbag body 21 is lower than the set pressure P, the connecting band 28 maintains the connection between the side closer to the base 23 (the side closer to the current straightening cloth 27) and the side closer to the occupant protecting portion 21*a* of the airbag body 21. On the other hand, when the internal pressure of the airbag body 21 becomes equal to or greater than the set pressure P, the connecting band 28 is torn and releases the connection. When the connecting band 28 is torn, the airbag body 21 is allowed to be fully deployed to an original deployed shape (see FIGS. 3B, 4B and 5B).

The inflator 30 is a multi-stage inflator including a plurality of individually-ignition-controllable inflator units. According to the present embodiment, the inflator 30 is a two-stage inflator having a main inflator unit 31 and a secondary inflator unit 32 and the inflator units 31 and 32 can be ignited at different timings in response to a control signal from a later-described control unit 35 (controller). According to the present embodiment, for example, the main inflator unit 31 generates inflation gas in an amount enough to immediately raise the internal pressure of the airbag body 21 up to a level of 350 KPa when only the main inflator unit 31 is ignited. The secondary inflator unit 32, for example, generates inflation gas in an amount enough to immediately raise the internal pressure of the airbag body 21 up to a level of 130 KPa when only the secondary inflator unit 32 is ignited.

As shown in FIG. 1, to the control unit 35, an acceleration sensor 36 that detects a crash acceleration generated when a vehicle crashes, and a vehicle speed sensor 37 are connected. When an acceleration input from the acceleration sensor 36 becomes equal to or greater than a predetermined threshold value, the control unit 35 determines whether a vehicle crash has occurred. When it is determined that a vehicle crash has occurred, the control unit 35 selects a control pattern corresponding to a vehicle speed V at the time of crash determination from previously set plural ignition control patterns and performs an ignition control of the inflator units 31 and 32 according to the selected control pattern. According to the present embodiment, a first control pattern and a second control pattern are set to the control unit 35.

The first control pattern is, for example, a control pattern to control the maximum internal pressure of the airbag 20 in a deployed state to be equal to or greater than the set pressure P (P=400 KPa, for example). The first control pattern is selected, for example, when the vehicle speed V at the crash determination is equal to or greater than 25 mph. When the first control pattern is selected, the control unit 35 ignites the first and second inflator units 31 and 32 at the same time (simultaneous ignition) or successively with a very short delay (within a delay of 10 ms, for example).

The second control pattern is, for example, a control pattern to control the maximum internal pressure of the airbag 20 in a deployed state to be less than the set pressure P. The second control pattern is selected when the vehicle speed V at the crash determination is equal to or greater than 16 mph and less than 25 mph, for example. When the second control pattern is selected, the control unit 35 successively ignites the first and second inflator units 31 and 32 with a predetermined delay (100 msec, for example).

According to the present embodiment, when the vehicle speed V at the crash determination is less than 16 mph, the ignition control for the first and second inflator units 31 and 32 is canceled.

Next, the ignition control of the inflator 30 executed by the control unit 35 will be described with reference to a flowchart of an ignition control routine shown in FIG. 6.

When the routine starts, the control unit 35 first checks in step S101 whether a vehicle crash has occurred. Specifically, the control unit 35 checks whether a vehicle crash has occurred by monitoring whether the acceleration input from the acceleration sensor 36 becomes equal to or greater than the set threshold value.

In step S101, when it is determined that the acceleration is less than the threshold value and there is no vehicle crash, the control unit 35 repeats the crash determination based on the acceleration input from the acceleration sensor 36 in step S101.

On the other hand, when it is determined in step S101 that a vehicle crash has occurred, the control unit 35 proceeds to step S102 and checks whether the vehicle speed V at the crash determination is equal to or greater than a first set vehicle speed V1 (V1=16 mph, for example).

When it is determined in step S102 that the vehicle speed V at the crash determination is less than the first vehicle speed V1 and the current crash is a very minor crash, the control unit 35 ends the routine.

On the other hand, when it is determined in step S102 that the vehicle speed V at the crash determination is equal to or greater than the first set vehicle speed V1, the control unit 35 proceeds to step S103 and checks whether the vehicle speed V at the crash determination is equal to or greater than a second set vehicle speed V2 (V2=25 mph, for example).

When it is determined in step S103 that the vehicle speed V at the crash determination is equal to or greater than the second set vehicle speed V2 and the current crash is a severe crash, the control unit 35 proceeds to step S104 and performs an ignition control of the main inflator unit 31 and the secondary inflator unit 32 according to the first control pattern. After that, the control unit 35 ends the routine.

More specifically, when the process proceeds from step S103 to step S104, the control unit 35 ignites the main inflator unit 31 and the secondary inflator unit 32 substantially at the same time. The maximum internal pressure of the airbag 20 in a deployed state is thus equal to or greater than the set pressure (400 MPa, for example) and the connecting band 28 is torn. When the connecting band 28 is torn, the airbag body 21 fully deploys. In other words, the airbag body 21 fully deploys to be a deployed shape which is preferable to protect an occupant in a regular seating position from a crash by restraining the occupant (see FIGS. 3B, 4B and 5B).

On the other hand, when it is determined in step S103 that the vehicle speed V at the crash determination is less than the second set vehicle speed V2 and that the current crash is a minor crash, the control unit 35 proceeds to step S105 and performs an ignition control of the main inflator unit 31 and the secondary inflator unit 32 according to the second control pattern. After that, the control unit 35 ends the routine.

More specifically, when the process proceeds from step S103 to step S105, the control unit 35 first ignites the main inflator unit 31 and then ignites the secondary inflator unit 32 after a sufficient delay time (100 msec, for example). With this configuration, the secondary inflator unit 32 is ignited after inflation gas generated by the main inflator unit 31 is sufficiently discharged via the exhaust ports 24La and 24Ra so that the maximum internal pressure of the deployed airbag 20 is maintained less than the set pressure. The connecting band 28 is thus maintained without being torn and the deployment of the airbag body 21 is partially limited. In other words, in a case of a crash at a certain slow speed, the protruding amount of the airbag body 21 toward the occupant (a recession amount of the occupant protecting portion 21*a*) is limited and the depth of the concave portion 21*b* increases so that the airbag body 21 deploys to be a shape that is preferable to reduce harmfulness to a child standing forward of the regular seating position, for example (see FIGS. 3A, 4A and 5A).

According to the above-described embodiment, the first control pattern for controlling the maximum internal pressure of the airbag 20 in a deployed state to be equal to or greater than the set pressure P and the second control pattern for controlling the maximum internal pressure of the airbag 20 in a deployed state to be less than the set pressure P are set to the control unit 35 as ignition control patterns for the multi-stage inflator 30, and the connecting band 28 is provided to the airbag 20 to connect the side closer to the base 23 and the side closer to the occupant protecting portion 21*a* of the airbag body 21 in order to partially limit the deployment in the side closer to the occupant protecting portion 21*a* when the airbag body 21 is deployed. In addition, the strength of the connecting band 28 is set such that the connecting band 28 is to be torn when the internal pressure of the airbag 20 in a deployed state is equal to or greater than the set pressure P, whereby the airbag 20 can be deployed in different shapes according to the ignition control patterns for the inflator 30. Since the deployed shape of the airbag 20 by the second control pattern is formed in a shape that is also harmless to an occupant who is out of the regular seating position by adjusting the connecting band 28 for example, it is possible to realize reduction of harmfulness to an occupant who is out of the regular seating position at a minor crash and protection of an occupant in a regular seating position at a severe crash at an improved level.

In other words, in case of a light crash at a slow speed, the concave portion 21*b* at the middle part of the occupant protecting portion 21*a* is largely formed so that the impact applied by the airbag 20 to the occupant who is out of the regular seating position, especially the occupant's head or neck which is less tolerable, is reduced and thereby harmfulness can be reduced. On the other hand, in a case of a severe crash, since the occupant protecting portion 21*a* is fully deployed to an original deployed state, the occupant in the regular seating position can be restrainted by the airbag 20 at an early stage and thereby sufficient occupant protection performance can be realized.

The above embodiment describes an example in which the connecting band 28 is an uniform strip-shaped member; however, the present invention is not limited to this example and slits 28*a* may be provided in a part of the connecting band 28 to be torn as shown in FIG. 7A in order to properly adjust the relationship between the maximum internal pressure of the airbag 20 in a deployed state and the strength of the connecting band 28, for example.

Further, the method for releasing the limit upon the deployment of the airbag 20 is not limited to the configuration using disconnection as described above. For example, as shown in FIG. 7B, a part of the connecting band 28 is folded and stitched, and this stitched portion 28*b* may be unfolded to release the limit according to the maximum internal pressure of the airbag 20 in a deployed state.

In addition, the straightening cloth 27 may also be used as a limiter and the side closer to the occupant protecting portion 21*a* of the airbag body 21 may be directly linked to the straightening cloth 27 with a predetermined strength, which is not illustrated.

What is claimed is:

1. An airbag apparatus comprising:
- an airbag;
- a limiter configured to partially limit deployment of an occupant protecting portion side of the airbag;
- a multi-stage inflator that includes plural inflator units which are individually ignition controllable; and
- a controller configured to perform an ignition control of the inflator,
- wherein the limiter is configured to release the limit when an internal pressure of the airbag in a deployed state becomes equal to or greater than a set pressure, and
- the controller includes, as ignition control patterns for the inflator, a first control pattern for controlling a maximum internal pressure of the airbag in a deployed state to be equal to or greater than the set pressure and a second control pattern for controlling the maximum internal pressure of the airbag in a deployed state to be less than the set pressure.

2. The airbag apparatus according to claim 1, wherein the controller controls the maximum internal pressure of the airbag by controlling ignition timings for the respective inflator units.

3. The airbag apparatus according to claim 1, wherein the airbag has a deployed shape including a concave portion at a middle part of the occupant protecting portion and the limiter forms the concave portion deeper than that in a non-limited state.

4. The airbag apparatus according to claim 1, wherein the limiter is a connecting member for connecting a base side and the occupant protecting portion side of the airbag.

5. The airbag apparatus according to claim 4, wherein the limiter releases the limit by being torn at a portion thereof by an internal pressure of the airbag in a deployed state.

6. The airbag apparatus according to claim 5, wherein the limiter has a slit to be torn.

7. The airbag apparatus according to claim 4, wherein the limiter has a stitched portion at which a part of the limiter is folded and stitched and the stitched portion is unfolded by the internal pressure of the airbag in a deployed state so that the limit is released.

* * * * *